United States Patent [19]

Tomlinson

[11] 4,259,403
[45] Mar. 31, 1981

[54] CURED FIBERS COATED WITH ADHESION PROMOTING ADDITIVES FOR ETHYLENE-PROPYLENE-NONCONJUGATED DIENE ELASTOMERS

[75] Inventor: Richard W. Tomlinson, Watertown, Conn.

[73] Assignee: Uniroyal, Inc., New York, N.Y.

[21] Appl. No.: 3,834

[22] Filed: Jan. 16, 1979

[51] Int. Cl.³ .................. D02G 3/48; B32B 27/04
[52] U.S. Cl. ..................... 428/378; 156/110 A; 156/241; 156/334; 156/335; 427/208.2; 427/389.9; 427/393.5; 427/407.1; 427/412; 427/434.6; 428/365; 428/379; 428/390; 428/393; 428/395; 525/344; 525/346; 525/354
[58] Field of Search ........... 156/334, 335, 241, 110 A; 427/385 B, 390 R, 434 D, 434 E, 407 R, 208.2, 389.9, 393.5, 407.1, 434.6, 412; 260/31.2 MR, 23.7 M, 45.8 A; 526/5; 428/375, 379, 390, 365, 379, 395, 393; 525/344, 346, 354

[56] References Cited
U.S. PATENT DOCUMENTS

| | | | |
|---|---|---|---|
| 3,262,482 | 7/1966 | Clifton et al. | 156/335 X |
| 3,663,268 | 5/1972 | Wilson | 156/335 X |
| 3,725,326 | 4/1973 | Solomon | 156/334 X |
| 3,823,122 | 7/1974 | Schuh et al. | 526/5 X |
| 3,860,442 | 1/1975 | Natta et al. | 156/335 X |
| 3,886,234 | 5/1975 | Ishihara et al. | 526/5 X |
| 4,076,668 | 2/1978 | Kaneda et al. | 156/110 A X |
| 4,137,359 | 1/1979 | Bak et al. | 428/295 |
| 4,157,992 | 6/1979 | Lundberg et al. | 260/23.7 M X |

*Primary Examiner*—Ronald H. Smith
*Assistant Examiner*—Thurman K. Page
*Attorney, Agent, or Firm*—Paul H. Ginsburg

[57] ABSTRACT

An acid of the formula A$-$(COOH)$_x$, or an anhydride thereof, wherein x is an integer of 1 or 2, wherein the acid groups are vicinal if x is 2, and A is phenyl, $C_2$-$C_{10}$ alkylene, $C_2$-$C_{10}$ alkenylene, $C_6$-$C_{10}$ bridged or non-bridged cycloalkylene or cylcoalkenylene, with the proviso that A is $C_1$-$C_6$ alkyl if x is 1, renders ethylene-propylene-nonconjugated diene elastomers more adherent to fibers that have been treated with a resorcinol-formaldehyde-latex dip when said elastomers are cured directly onto said fibers.

18 Claims, No Drawings

CURED FIBERS COATED WITH ADHESION PROMOTING ADDITIVES FOR ETHYLENE-PROPYLENE-NONCONJUGATED DIENE ELASTOMERS

BACKGROUND OF THE INVENTION

The present invention relates to the addition of adhesion promoting additives to ethylene-propylene-nonconjugated diene (EPDM) elastomers.

Adhesion of EPDM elastomers to fibers or fabrics has been very difficult for those skilled in the art. Among the methods used for improving such adhesion are pretreating the fabric with a special latex or a chemically reactive substance, chemically modifying the elastomer, and adding an ingredient directly to an elastomer composition that will render it more adherent upon curing the composition onto a fabric substrate.

Various adhesion promoting additives useful in the last method are disclosed in Belgian Pat. No. 778,284, U.S.S.R. Pat. No. 275,372, French Pat. No. 1,439,245, Rumanian Pat. No. 192,329, and U.S. Pat. No. 2,844,502.

It has been found that an acid of the formula $A$-$(COOH)_x$, or an anhydride thereof, wherein x and A are as defined below, renders ethylene-propylene-nonconjugated diene (EPDM) elastomers more adherent to fibers that have been treated with a resorcinolformaldehyde-latex (RFL) dip when said elastomers are cured directly onto said fibers.

In a preferred embodiment of the present invention, a cobalt or copper salt, for example, cobalt naphthenate, is added along with the aforementioned adhesion promoting compounds to further improve adhesion. While cobalt naphthenate is known to improve metal adhesion of elastomeric stocks, no mention has ever been made of its use in fabric adhesion, by itself or in conjunction with other compounds.

SUMMARY OF THE INVENTION

The present invention relates to a method of bonding an EPDM elastomer to fibers that have been treated with an RFL dip, comprising preparing a composition comprising said elastomer and 0.5 to 5.0 parts per hundred, by weight, based on the weight of said elastomer, of sulfur, 0.1 to 3.5 parts per hundred, by weight, based on the weight of said elastomer, of accelerator, and 1.0 to 5.0 parts per hundred, by weight, based on the weight of said elastomer, of an additive which is an acid of the formula $A$-$(COOH)_x$, or an anhydride thereof, wherein x is an interger of 1 or 2, wherein the acid groups are vicinal if x is 2, and A is phenyl, $C_2$-$C_{10}$ alkylene, $C_2$-$C_{10}$ alkenylene, $C_6$-$C_{10}$ bridged or nonbridged cycloalkylene or cycloalkenylene, with the proviso that A is $C_1$-$C_6$ alkyl if x is 1, and then applying the resulting mixture to said fibers and curing the resulting combination.

The present invention also relates to a composition of matter comprising an EPDM elastomer, 0.5 to 5.0 parts per hundred, by weight, based on the weight of said elastomer, of sulfur, 0.1 to 3.5 parts by weight, based on the weight of said elastomer, of accelerator, and 1.0 to 5.0 parts by weight, based on the weight of said elastomer, of an additive selected from an acid of the formula $A$—$COOH)_x$, or an anhydride thereof, wherein x and A are as defined above.

The present invention also relates to a cured composite comprising a first layer of a plurality of fibers which are coated with the dried residue of a RFL dip adhered to a second layer comprising an EPDM elastomer in admixture with 0.5 to 5.0 parts per hundred, based on the weight of said elastomer of sulfur, 0.1 to 3.5 parts per hundred, by weight, based on the weight of said elastomer, of accelerator, and 1.0 to 5.0 parts by weight, based on the weight of said elastomer, of an additive selected from an acid of the formula $A$-$(COOH)_x$, or an anhydride thereof, wherein x and A are as defined above.

The preferred additives used in the present invention are 5-norbornene-2,3-dicarboxylic anhydride, 5-norbornene-2,3-dicarboxylic acid and cis-4-cyclohexene-1,2-dicarboxylic anhydride.

In a most preferred embodiment of the present invention, the additive is 5-norbornene-2,3-dicarboxylic anhydride and 0.1 to 1.0 grams of cobalt or copper per hundred grams of EPDM elastomer composition are used. The cobalt or copper is added as an organic or inorganic salt. For example, 3.0 grams of cobalt naphthenate would yield the required 0.42 grams of cobalt. The preferred salts are cobalt naphthenate, cobalt acetate, cobalt stearate, cobalt sulfate, cobalt 2-ethylhexonate, cobalt oleate, cobalt phosphate, cobalt resinate, and copper naphthenate. Although both cobalt and copper salts further increase the adhesion when 5-norbornene-2,3-dicarboxylic anhydride is used according to the present invention, only in the case of cobalt salts is it observed that there is an increased amount of rubber remaining attached to the fabric in the stock failure test described in the examples. Cobalt salts are therefore more preferred than copper salts as additives.

The EPDM of the present invention preferably comprises from 30 to 80 percent by weight ethylene, from 20 to 70 percent by weight propylene, and from 2 to 25 percent by weight of a nonconjugated diene. Nonlimiting examples of suitable dienes are dicyclopentadiene, methylidene norbornene, ethylidene norbornene, and 1,4-hexadiene. The norbornenes are preferred dienes, and 5-ethylidene-2-norbornene is most preferred.

The sulfur that is required in the present invention may be elemental sulfur or may be provided by a sulfur donor system, a nonlimiting example being dipentamethylene thiuram hexasulfide which is 35% available sulfur. Among the forms of elemental sulfur that may be used are those that are referred to in the art as soluble sulfur and insoluble sulfur (polymerized sulfur).

The fabric adhesion achieved with the present invention is dependent upon the cure rate. The longer the cure rate, the better will be the adhesion. The use of thiazoles, which are slower curing, generally results in better adhesion than the use of thiurams or carbamates.

The accelerator that is required in the present invention is thus preferably a thiazole or thiazole salt, nonlimiting examples being N-t-butyl-2-benzothiazole, N-cyclohexyl-2-benzothiazole, 2-(4-morpholinylmercapto)benzothiazole, 2-mercaptobenzothiazole and its zinc salt, 2,2'-dibenzothiazyl disulfide, and thiocarbamyl sulfenamide. The most preferred accelerator is N-t-butyl-2-benzothiazole.

The accelerator used may also be a mixture of two or more accelerators, for example, a thiuram or carbamate plus a thiazole.

Cure temperature and cure time are selected to yield optimum fabric adhesion. Generally, cure temperatures of 275° F. to 400° F. and cure times of 5 to 120 minutes are preferred. Most preferred are cure temperatures of 325° F. to 350° F. and cure times of 7 to 25 minutes.

The additives of the present invention may be added to the elastomer alone, before the addition of any other materials, or they may be added to a compounded stock that also contains filler and/or curatives. Fillers and other compounding ingredients can be varied to meet the needs of various applications, for examples, wire and cable, conveyor belting, tires, etc. The addition of the additives to the elastomer or the elastomer composition may be performed in standard rubber compounding equipment such as Banbury mixer or a mill. The additives may be added at normal rubber processing temperatures, generally 100° F. to 375° F.

The fibers that are used in the present invention are those fibers that can be successfully treated with an RFL dip system. The RFL dip may be preceded by another dip, nonlimiting examples being an isocyanate dip or a polyepoxy dip. Nonlimiting examples of such fibers are rayon, nylon and polyester. The fibers may take a variety of forms, for example, yarn, cord or fabric. The preferred latex used in the dip system is butadiene/styrene/vinyl pryidine.

In the examples below, the fabric treating solution is an RFL dip. The RFL dip was prepared using the following:

| A | |
|---|---|
| | Parts |
| Butadiene/styrene/vinyl pyridine (70/16/14) copolymer rubber latex, 40% solids (Pyratex [trademark] 5360) | 100.0 |

| B | |
|---|---|
| | Parts |
| Resorcinol-formaldehyde resin ball and ring softening point 102–112° C., 75% solids (Koppers [trademark] R2170) | 11.4 |
| Ammonium hydroxide (28%) | 3.1 |
| Distilled water | 85.5 |
| | 100.0 |

| C | |
|---|---|
| | Parts |
| Formaldehyde (37%) | 6.5 |
| Distilled water | 93.5 |
| | 100.0 |

31.1 grams of solution B was added to 40.4 grams of solution A with rapid stirring. 28.5 grams of solution C was then added to the mixture of A and B. The resulting solution was adjusted to a pH of 9.0 by the addition of ammonium hydroxide (28%). After the dip was brushed onto the fabric, the treated fabric was oven dried for three minutes at 400° F. The amount of resin retained by the fabric was 5.5 percent by weight of the fabric.

The EPDM elastomer compositions containing sulfur, accelerator, and adhesion promoters in the following examples were prepared by mixing the elastomer with compounding ingredients in a Brabender Prep Center [trademark] equipped with a cam-style mixing head. The EPDM composition was blended for five minutes at 100° C. using a mixing speed of 50 RPM. Thereafter, the stock was refined by passing it eight times through a mill at room temperature. The stock removed from the mill had a 40-gauge thickness.

Adhesion and stock failure test pads evaluated in the examples were prepared in a 5-inch×6-inch×0.25-inch stainless steel mold. A 5-inch×6-inch piece of treated fabric was placed on each side of a 5-inch or 6-inch×40-gauge test stock. A 5-inch×6-inch×100 gauge backing stock was placed on each side of the fabric. The backing stock was an EPDM also containing a sulfur curative system. Aluminum foil spacers were spaced between the fabric and test stock at one end of the pad so that the backing-fabric composite could be peeled back after cure and inserted in the jaws of a tensile tester. The pad was cured in the mold under 10,000 psi gauge pressure. The cured pad was cut into one-inch strips and tested on a tensile tester at a separation rate of two inches per minute. The test strips were tested at room temperature after aging 24 hours at room temperature. Adhesion results are reported as average pounds per linear inch (pli).

Stock failure results are reported as a visual evaluation of the percent stock remaining attached to the surface of the RFL treated fabric.

Test pads were prepared as described above using the indicated treated fabric and compounded stock. The stock was cured 30 minutes at 350° F. The physical properties and adhesion results of the cured stock are given in the examples.

EXAMPLES

The EPDM elastomer compositions shown in Tables I–VII were compounded as described above. The following recipe was used for the Examples shown in Tables I, II, III, IV, V, and VI:

| Ingredients | Parts |
|---|---|
| EPDM | 100 |
| FEF Carbon Black | 40 |
| Paraffinic oil | 15 |
| Zinc Oxide | 5 |
| Stearic Acid | 1 |

The Mooney Viscosity (ML-4) of the EPDM starting materials of the Examples shown in Tables I–IV and VI at 257° F. is 30, and the diene used in the EPDM as above was 5-ethylidene-2-norbornene having an ethylene/propylene weight ratio of 57/43 and an Iodine Number of 10.

The EPDM elastomer compositions shown in Table V were also compounded as described above. However, the EPDM polymers of Table V had the following properties:

| | Example 23 | Example 24 |
|---|---|---|
| Termonomer | DCPD | 1,4-Hexadiene |
| E/P Ratio | 54/46 | 56/44 |
| Iodine No. | 10 | 8 |
| Mooney Viscosity ML-4 at 257° F. | 60 | 60 |

The EPDM elastomer compositions shown in Table VII were compounded as described previously according to the following recipe:

| Ingredients | Parts |
|---|---|
| EPDM | 100 |
| FEF Carbon Black | 40 |
| Paraffinic Oil | 10 |
| Zinc Oxide | 5 |
| Stearic Acid | 1 |

The Mooney Viscosity (ML-4) of the EPDM starting material at 257° F. was 50. The diene used in the EPDM was 5-ethylidene-2-norbornene having an ethylene/propylene weight ratio of 57/43 and Iodine Number of 21.

The levels of the constituents in Examples 1–32, other than those listed above, are in parts per hundred (phr) by weight, based on the weight of elastomer.

The fabric employed in the Examples was a plain weave nylon, 808/1 denier treated with the RFL solution. The cobalt naphthenate used in the Examples had a molecular weight of 419 and contained 14% cobalt.

EXAMPLES 1–8 (TABLE I)

Example 1 illustrates the most preferred embodiment of the present invention. Excellent adhesion is obtained as evidenced by the amount of pull necessary to separate the test strips. Moreover, the addition of cobalt naphthenate gives 100% stock failure; i.e., even after the test strips have been separated, 100% of the elastomer composition prepared according to the present invention remains attached to the fabric.

Example 2 illustrates that 5-norbornene-2,3-dicarboxylic anhydride will give good adhesion even in the absence of copper or cobalt. This is shown by the fact that the amount of force necessary to separate the test strips is high. Although a surprising improvement in adhesion is obtained, percent stock failure is poor. This means that when separation finally occurs, the rubber pulls away from the fabric completely. It is for this reason that the further addition of cobalt or copper is most preferred.

Example 3 which is outside the scope of the present invention is presented for comparative purposes.

Examples 4 and 5 illustrate that various levels of 5-norbornene-2,3-dicarboxylic anhydride can be used to achieve acceptable levels of adhesion.

Examples 6, 7 and 8 illustrate that various levels of cobalt naphthenate (expressed as grams of cobalt per hundred grams of EPDM elastomer) achieved acceptable adhesion and improved stock failure.

EXAMPLES 9–12 (TABLE II)

Examples 9 and 10 illustrate that different typs of cyclic dicarboxylic acids or anhydrides thereof can be used in place of 5-norbornene-2,3-dicarboxylic anhydride and good adhesion obtained.

Examples 11 and 12 illustrate that metal salts other than cobalt napthenate can be used in combination with 5-norbornene-2,3-dicarboxylic anhydride to improve adhesion. Cobalt or copper levels are expressed as described above.

EXAMPLES 13–17 (TABLE III)

Example 13 illustrates that good adhesion is still obtained even when the level of accelerator is increased.

Example 14 illustrates that an accelerator is necessary for good adhesion.

Examples 15, 16 and 17 illustrate that accelerators other than N-t-butyl-2-benzothiazole can be used and good adhesion obtained.

EXAMPLES 18–22 (TABLE IV)

Examples 18 and 19 illustrate that various levels of sulfur can be used and good adhesion obtained.

Examples 20, 21 and 22 illustrate that sulfur in various forms can be used, including sulfur donor systems or insoluble (polymerized) sulfur. Good adhesion and stock failure values are obtained using either system.

EXAMPLES 23 AND 24 (TABLE V)

Both examples 23 and 24 illustrate that the adhesion of the EPDM to RFL treated fabric is increased by the use of the method of the present invention.

TABLE VI

EXAMPLES 25–26

The results shown in Table VI illustrate that other anhydrides including succinic and phthlate anhydride give good levels of adhesion. They also show that other compounding ingredients may be used without affecting the level of adhesion.

TABLE VII

EXAMPLES 27–32

The results shown in Table VII illustrate that other anhydrides and acids including maleic anhydride or maleic acid, phthalic acid, adipic acid, and acetic anhydride or acetic acid give good levels of adhesion as well as showing that a polyester fabric that has been pretreated with an isocyanate dip prior to the RFL dip can be used.

TABLE I

| Ingredients (phr) | Examples 1–8 | | | | | | | |
|---|---|---|---|---|---|---|---|---|
| | 1 | 2 | 3 | 4 | 5 | 6 | 7 | 8 |
| N-t-butyl-2-benzothiazole | 1.0 | 1.0 | 1.0 | 1.0 | 1.0 | 1.0 | 1.0 | 1.0 |
| Sulfur | 1.5 | 1.5 | 1.5 | 1.5 | 1.5 | 1.5 | 1.5 | 1.5 |
| 5-Norbornene-2,3-dicarboxylic anhydride | 3.0 | 3.0 | — | 1.5 | 5.0 | 3.0 | 3.0 | 3.0 |
| Cobalt naphthenate (as cobalt (phr)) | 0.42 | — | — | — | — | 0.18 | 0.54 | 0.78 |
| Adhesion, pli | 97 | 45 | 8 | 36 | 30 | 62 | 73 | 43 |
| Stock failure, % | 100 | 0 | 0 | 0 | 0 | 20 | 20 | 20 |
| Physical Properties | | | | | | | | |
| Tensile, psi | 2340 | 2910 | 2240 | 2840 | 2900 | 2410 | 2550 | 2070 |
| Modulus, 300%, psi | 740 | 610 | 1120 | 980 | 830 | 910 | 590 | 540 |
| Elongation at break, % | 640 | 840 | 470 | 560 | 670 | 800 | 770 | 760 |

TABLE II

| Ingredients (phr) | Examples 9–12 | | | |
|---|---|---|---|---|
| | 9 | 10 | 11 | 12 |
| N-t-butyl-2-benzothiazole | 1.0 | 1.0 | 1.0 | 1.0 |
| Sulfur | 1.5 | 1.5 | 1.5 | 1.5 |
| 5-Norbornene-2,3-dicarboxylic anhydride | — | — | 3.0 | 3.0 |
| 5-Norbornene-2,3-dicarboxylic acid | 3.0 | — | — | — |
| cis-4-cyclohexene-1,2-dicarboxylic anhydride | — | 3.0 | — | — |
| Cobalt sulfate (as cobalt (phr)) | — | — | 0.84 | — |
| Copper naphthenate (as copper (phr)) | — | — | — | 0.44 |
| Adhesion, pli. | 39 | 27 | 81 | 53 |
| Stock failure, % | 0 | 40 | 20 | 0 |
| Physical Properties | | | | |
| Tensile, psi | 2750 | 3250 | 2370 | 2570 |
| Modulus, 300%, psi | 940 | 1190 | 640 | 740 |
| Elongation at break, % | 600 | 560 | 740 | 660 |

TABLE III

| Ingredients (phr) | Examples 13–17 | | | | |
|---|---|---|---|---|---|
| | 13 | 14 | 15 | 16 | 17 |
| N-t-butyl-2-benzothiazole Sulfur | 2.0 | — | — | — | — |
| Sulfur | 1.5 | 1.5 | 1.5 | 1.5 | 1.5 |
| 2-mercaptobenzothiazole | — | — | 1.5 | — | — |
| 2,2'-dibenzothiazyl disulfide | — | — | — | 1.0 | — |
| Thiocarbamyl sulfenamide | — | — | — | — | 2.0 |
| 5-Norbornene-2,3-dicarboxylic anhydride | 3.0 | 3.0 | 3.0 | 3.0 | 3.0 |
| Cobalt naphthenate (as cobalt (phr)) | 0.42 | 0.42 | 0.42 | 0.42 | 0.42 |
| Adhesion, pli | 63 | 16 | 88 | 82 | 69 |
| Stock failure, % | 20 | 0 | 100 | 0 | 0 |
| Physical Properties | | | | | |
| Tensile, psi | 2260 | 2550 | 2100 | 2370 | 2000 |
| Modulus, 300%, psi | 560 | 590 | 510 | 600 | 700 |
| Elongation at break, % | 860 | 770 | 860 | 750 | 600 |

TABLE IV

| Ingredients (phr) | Examples 18–22 | | | | |
|---|---|---|---|---|---|
| | 18 | 19 | 20 | 21 | 22 |
| N-t-butyl-2-benzothiazole | 1.0 | 1.0 | 1.0 | 1.0 | 1.0 |
| Sulfur | 1.0 | 2.5 | — | — | — |
| Dipentamethylene thiuram hexasulfide | — | — | 3.0 | — | — |
| Insoluble sulfur (polymerized sulfur) | — | — | — | 3.0 | 5.0 |
| 5-Norbornene-2,3-dicarboxylic anhydride | 3.0 | 3.0 | 3.0 | 3.0 | 3.0 |
| Cobalt naphthenate (as cobalt (phr)) | 0.42 | 0.42 | 0.42 | 0.42 | 0.42 |
| Adhesion, pli | 41 | 37 | 64 | 85 | 62 |
| Stock failure, % | 20 | 20 | 100 | 100 | 100 |
| Physical Properties | | | | | |
| Tensile, psi | 1370 | 1950 | 1150 | 1610 | 1430 |
| Modulus, 300%, psi | 300 | 940 | 270 | 810 | 1070 |
| Elongation at break, % | 1000 | 520 | 1000 | 520 | 390 |

TABLE V

| Ingredients (phr) | Examples 23–24 | |
|---|---|---|
| | 23 | 24 |
| EPDM (DCPD) | 100 | — |
| EPDM (1,4-hexadiene) | — | 100 |
| N-t-butyl-2-benzothiazole | 1.0 | 1.0 |
| Sulfur | 1.5 | 1.5 |
| 5-Norbornene-2,3-dicarboxylic anhydride | 3.0 | 3.0 |
| Adhesion, pli | 38 | 29 |
| Stock failure, % | 0 | 0 |
| Physical Properties | | |
| Tensile, psi | 2110 | 3020 |
| Modulus, 300%, psi | 480 | 410 |
| Elongation at break, % | 740 | 940 |

TABLE VI

| Ingredients (phr) | Examples 25–26 | |
|---|---|---|
| | 25 | 26 |
| N-t-butyl-2-benzothiazole | 0.8 | 0.8 |
| Sulfur | 1.5 | 1.5 |
| Diphenyl guanidine | 0.3 | 0.3 |
| Succinic anhydride | 3.0 | — |
| phtalic anhydride | — | 3.0 |
| Adhesion, pli | 31 | 29 |
| Stock failure, % | 20 | 0 |
| Physical Properties | | |
| Tensile, psi | 2670 | 2700 |
| Modulus, 300%, psi | 1370 | 1200 |
| Elongation at break, % | 460 | 490 |

TABLE VII

| Ingredients (phr) | Examples 27–32 | | | | | |
|---|---|---|---|---|---|---|
| | 27 | 28 | 29 | 30 | 31 | 32 |
| N-t-butyl-2-benzothiazole | 0.8 | 0.8 | 0.8 | 0.8 | 0.8 | 0.8 |
| Sulfur | 1.25 | 1.25 | 1.25 | 1.25 | 1.25 | 1.25 |
| Diphenyl guanidine | 0.3 | 0.3 | 0.3 | 0.3 | 0.3 | 0.3 |
| Maleic anhydride | 5.0 | — | — | — | — | — |
| Maleic acid | — | 5.0 | — | — | — | — |
| Phthalic acid | — | — | 5.0 | — | — | — |
| Adipic acid | — | — | — | 5.0 | — | — |
| Acetic anhydride | — | — | — | — | 5.0 | — |
| Acetic acid | — | — | — | — | — | 1.8 |
| Adhesion, pli | 43 | 40 | 50 | 38 | 45 | 43 |
| Stock failure, % | 80 | 30 | 20 | 20 | 0 | 0 |
| Physical Properties | | | | | | |
| Tensile, psi | 2050 | 1890 | 3000 | 1320 | 3390 | 3690 |
| Modulus, 300%, psi | 400 | 440 | 1120 | 480 | 910 | 1160 |

I claim:

1. A composition comprising an ethylene-propylene-non-conjugated diene elastomer, 0.5 to 5.0 parts per hundred by weight of sulfur, based on the weight of said elastomer, 0.1 to 3.5 parts per hundred by weight, based on the weight of said elastomer of an accelerator, and 1.0 to 5.0 parts per hundred by weight of an additive selected from an acid of the formula $A(-COOH)_x$ or an anhydride thereof, wherein x is an integer of 1 or 2 and wherein if X is 2 the acid groups are vicinal and A is phenyl, $C_2-C_{10}$ alkylene, $C_2-C_{10}$ alkenylene, $C_6-C_{10}$ bridged or non bridged cycloalkylene, or cycloalkenylene, and if X is 1, A is $C_1-C_6$ alkyl, said composition also comprising 0.1 to 1.0 parts per hundred by weight, based on the weight of said elastomer, of cobalt or copper in the form of a cobalt or copper salt selected from the group consisting of copper naphthenate, cobalt naphthenate and cobalt sulfate.

2. A method of bonding an ethylene-propylene-non-conjugated diene elastomer to fibers that have been treated with a resorcinol-formaldehyde-latex dip comprising preparing a composition as claimed in claim 1, applying said composition to said fibers and curing the resulting combination.

3. A method as claimed in claim 2, wherein said additive is 5-norbornene-2,3-dicarboxylic anhydride, 5-norbornene-2,3-dicarboxylic acid or cis-4-cyclohexene-1,2-dicarboxylic anhydride.

4. A method as claimed in claim 2, wherein said elastomer comprises from 30 to 80 percent by weight, based on the weight of said elastomer, of ethylene, from 20 to 70 percent by weight, based on the weight of said elastomer, of propylene, and from 2 to 25 percent by weight, based on the weight of said elastomer, of a non-conjugated diene.

5. A method as claimed in claim 2, wherein the non-conjugated diene component of said elastomer is 5-ethylidene-2-norbornene, dicyclopentadiene, or 1,4-hexadiene.

6. A method as claimed in claim 2, wherein the accelerator is a thiazole accelerator.

7. A method as claimed in claim 2, wherein the cure temperature is 275° to 400° F.

8. A method as claimed in claim 2, wherein the cure time is 5 to 120 minutes.

9. A method as claimed in claim 2, wherein the sulfur is elemental sulfur.

10. A method as claimed in claim 2, wherein the sulfur is provided by a sulfur donor system.

11. A cured composite comprising a first layer of a plurality of fibers which are coated with the dried residue of a resorcinol-formaldehyde-latex dip adhered to a second layer comprising a composition as claimed in claim 1.

12. A composite according to claim 11, wherein the sulfur is provided by a sulfur donor system.

13. A method according to any one of claim 2, 3, or 5-11, wherein said salt is cobalt naphthenate, copper naphtenate, or cobalt sulfate.

14. A composite according to claim 11, wherein said additive is 5-nonbornene-2,1-dicarboxylic anhydride, 5-norbornene-2,3-dicarboxylic acid or cis-4-cyclohexene-1,2-dicarboxylic anhydride.

15. A composite according to claim 11, wherein said elastomer comprises from 30 to 80 percent by weight, based on the weight of said elastomer, of ethylene, from 20 to 70 percent by weight, based on the weight of said elastomer, of propylene, and from 2 to 25 percent by weight, based on the weight of said elastomer, of a non-conjugated diene.

16. A composite according to claim 11, wherein the nonconjugated diene component of said elastomer is 5-ethylidene2-norbornene, dicyclopentadiene, or 1,4-hexadiene.

17. A composite according to claim 11, wherein the accelerator is a thiazole accelerator.

18. A composite according to claim 11, wherein the sulfur is elemental sulfur.

* * * * *